US009037958B2

(12) United States Patent
Allen et al.

(10) Patent No.: US 9,037,958 B2
(45) Date of Patent: May 19, 2015

(54) DYNAMIC CREATION OF USER INTERFACE HOT SPOTS

(75) Inventors: Joshua S. Allen, Durham, NC (US); Richard A. King, Cary, NC (US); Vijay Pandiarajan, Apex, NC (US); Kenneth J. Parzygnat, Apex, NC (US); Shikha Srivastava, Cary, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 650 days.

(21) Appl. No.: 13/302,541

(22) Filed: Nov. 22, 2011

(65) Prior Publication Data

US 2013/0132869 A1 May 23, 2013

(51) Int. Cl.
G06F 17/00 (2006.01)
G06F 9/44 (2006.01)
G06F 3/0481 (2013.01)
G06F 17/30 (2006.01)

(52) U.S. Cl.
CPC .............. *G06F 8/34* (2013.01); *G06F 3/0481* (2013.01); *G06F 17/3089* (2013.01)

(58) Field of Classification Search
CPC ...... G06F 3/0481; G06F 8/34; G06F 17/2235
USPC ................ 715/200, 205, 207, 208, 255, 262
See application file for complete search history.

(56) References Cited

U.S. PATENT DOCUMENTS 5,590,262 A * 12/1996 Isadore-Barreca ........... 715/201
5,737,553 A * 4/1998 Bartok .......................... 715/764
6,075,537 A    6/2000 Adapathya et al.
6,253,229 B1   6/2001 Nielsen et al.
6,664,990 B1 * 12/2003 Bates et al. ................... 715/857
2002/0080165 A1 * 6/2002 Wakefield ..................... 345/738
2003/0192049 A1 * 10/2003 Schneider et al. .............. 725/51
2004/0233235 A1  11/2004 Rubin et al.
2005/0050021 A1 * 3/2005 Timmons .......................... 707/3
2005/0069225 A1 * 3/2005 Schneider et al. ............ 382/305
2006/0089843 A1   4/2006 Flather
2008/0010585 A1 * 1/2008 Schneider et al. ............ 715/201
2011/0016376 A1   1/2011 Hinson
2011/0191699 A1 * 8/2011 Cunningham et al. ........ 715/762

FOREIGN PATENT DOCUMENTS

CN          101777072         7/2010

OTHER PUBLICATIONS

Daniel Schwabe et al., "Cohesive Design of Personailzed Web Applications", Apr. 2002.

* cited by examiner

*Primary Examiner* — Stephen Hong
*Assistant Examiner* — Gregory J Vaughn
(74) *Attorney, Agent, or Firm* — Convergent Law Group LLP

(57) ABSTRACT

Exemplary embodiments disclose a computer-implemented method for enabling an end-user to dynamically create a hot spot on a user interface (UI) of information resource without the end-user modifying underlying code of the UI. Aspects of the exemplary embodiment include responsive to the end-user activating a hot spot creation component, receiving a designation from the end-user of a location of the hot spot and a size of the hot spot within the UI; receiving from the end-user an assignment of a user gesture to the hot spot; receiving from the end-user an assignment of an action to the hot spot; and responsive to a detection of the user gesture on the hot spot, invoking the action assigned to the hot spot.

12 Claims, 4 Drawing Sheets

500

| Activation | Action (Parameter) |
|---|---|
| On Hover | — Browser Actions |
| On Right Click | —— Open Browser Page (URL) |
| On Left Click | —— Show Tooltip (Message) |
| Receive Event | — Portal Actions |
| On Key Press | —— Launch Portlet (Portlet ID) |
| | —— Launch Portal Page (Page ID) |
| | —— Pass context to other Portlets on page (Context) |
| | — Application Actions |
| | —— Insert New Data into Database (Context) |
| | —— Send Text Message (Message) |

502 — Activation
504 — Action (Parameter)
506, 508

FIG. 5

DYNAMIC CREATION OF USER INTERFACE HOT SPOTS

BACKGROUND

Most computer programs include a user interface through which a user communicates with the program. The user interface is one of the most important parts of a program because it determines how easily the user can control the program. Although in the past user interfaces were basically set commands or menus, virtually all programs today have a graphical user interface that simplifies tasks for the user. Many users are proficient enough to desire ways to customize the user interfaces of their programs to allow the user to perform their tasks faster and with more accuracy.

A customization that is frequently desired is the ability to add a launch point to a user interface that performs some action, or shows some additional information. Another name for a launch point may be the term hot spot. A hot spot is an area of a graphics object or a section of text that activates a function when selected. Hot spots are particularly common in web applications, where selecting a hot spot can make the application display a picture, run a video, or open a new window of information, for example.

One problem with traditional hot spots are that they must typically be set up by a programmer who adds the hot spot functionality to the user interface of a web application and determines both their size/location as well as their function. The end-user typically has no say in this process and is at the mercy of the programmer to decide what hot spots to place where in the user interface.

Thus, it would be desirable to provide a method and system that enables an end-user to dynamically create a user interface hot spot without the end-user having to modify underlying code of the user interface.

BRIEF SUMMARY

Exemplary embodiments disclose a computer-implemented method for enabling an end-user to dynamically create a hot spot on a user interface (UI) of information resource without the end-user modifying underlying code of the UI. Aspects of the exemplary embodiment include responsive to the end-user activating a hot spot creation component, receiving a designation from the end-user of a location of the hot spot and a size of the hot spot within the UI; receiving from the end-user an assignment of a user gesture to the hot spot; receiving from the end-user an assignment of an action to the hot spot; and responsive to a detection of the user gesture on the hot spot, invoking the action assigned to the hot spot.

BRIEF DESCRIPTION OF SEVERAL VIEWS OF THE DRAWINGS

FIG. 5 is a diagram illustrating an example configuration menu displayed by the hot spot creation component after the user defines a hot spot.

DETAILED DESCRIPTION

The exemplary embodiment relates to dynamically creating a user interface hot spot. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

Figure 1:
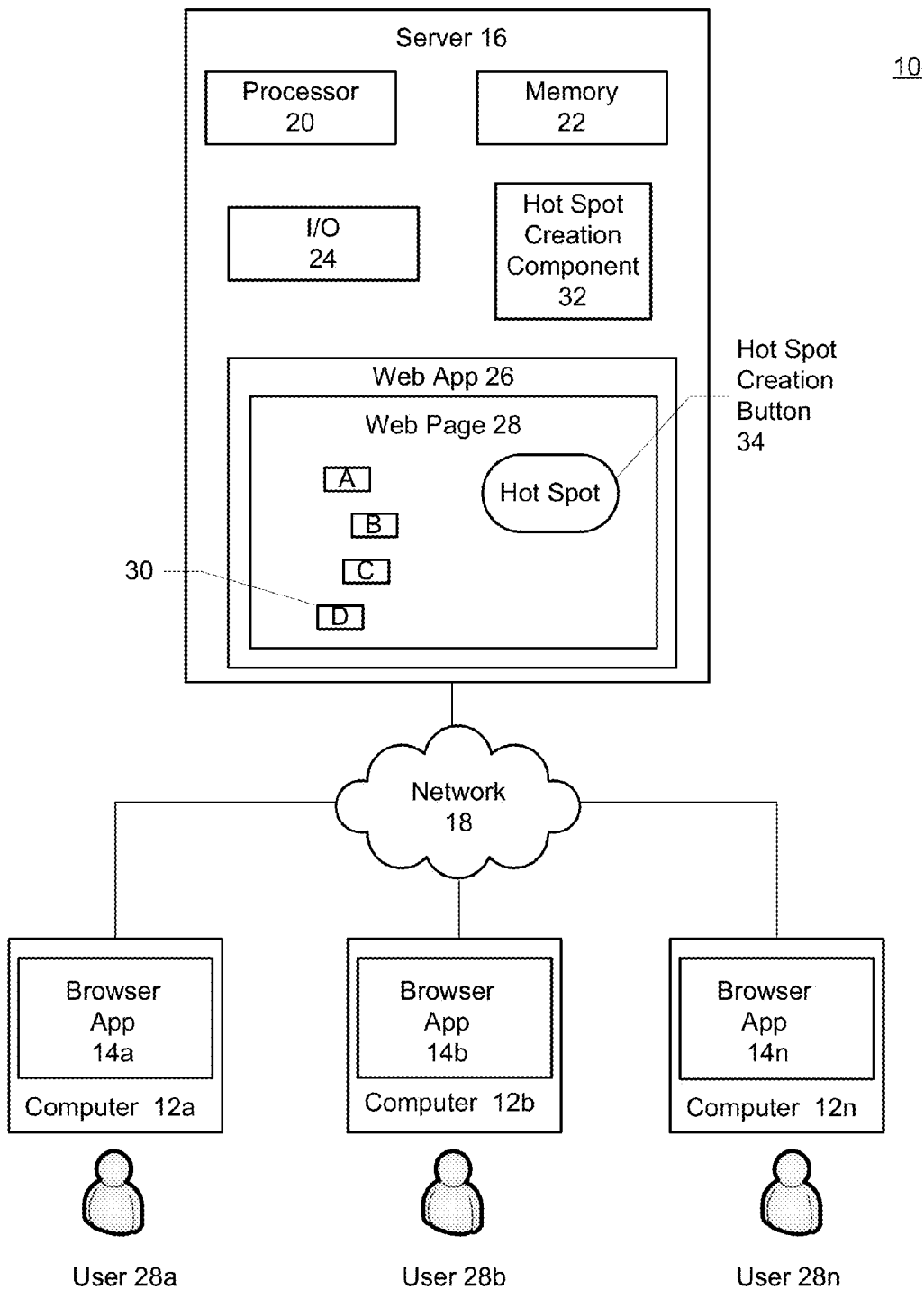
FIG. 1 is a logical block diagram illustrating an exemplary embodiment for a system that enables an end-user to dynamically create user interface hot spots.

FIG. 1 is a logical block diagram illustrating an exemplary embodiment for a system that enables an end-user to dynamically create user interface hot spots. The system 10 may include one or more computers 12a, 12b, 12n (collectively, computers 12) executing respective browser applications 14a, 14b, 14n (collectively, browser applications 14) and that communicate with a server 16 over network 18. The network 18 may be a public network, such as the Internet, or a private network (such as an intranet), a LAN, a WLAN, or a WMAX, or a combination of thereof. The server 16 may represent a single server or multiple servers, each having at least a processor 20, a memory 22, and an input/output (I/O) 24 coupled together via a system bus (not shown). In one embodiment, the server 16 may comprise a Web server, while in another embodiment the server 16 may comprise an application server.

The computers 12 may exist in various forms, including a personal computer (e.g., desktop, laptop, or notebook), a mobile phone, a personal digital assistant (PDA), a set-top box, a game system, and the like. Similar to the server 16, the computers 12 may include components of typical computing devices, such as processors, input devices (e.g., keyboard, pointing device, microphone for voice commands, buttons, touch screen, etc.), output devices (e.g., a display device). The server 16 and the computers 12 may further include computer-readable media, e.g., memory and storage devices (e.g., flash memory, hard drive, optical disk drive, magnetic disk drive, and the like) containing computer instructions that implement an embodiment of a process that enables an end-user 28 to dynamically create a user interface hot spot when executed by a processor.

The processor 20 may be part of data processing system suitable for storing and/or executing software code including an operating system and various web applications 16. The processor 20 may be coupled directly or indirectly to elements of the memory 22 through a system bus (not shown). The memory elements can include local memory employed during actual execution of the program code, bulk storage, and cache memories which provide temporary storage of at least some program code in order to reduce the number of times code must be retrieved from bulk storage during execution.

The input/output 24 or I/O devices (including but not limited to keyboards, displays, pointing devices, etc.) can be coupled to the system either directly or through intervening I/O controllers. Network adapters (not shown) may also be coupled to the system to enable the data processing system to become coupled to other data processing systems or remote printers or storage devices through intervening private or public networks. Modems, cable modems and Ethernet cards are just a few of the currently available types of network adapters.

In operation, the server 16 responds to different requests from conventional browser applications 14 executing on the computers 12 and presents, or serves, at least one web application 26 to the browser applications 14 for display to end-users 28a-28n (collectively referred to as end-users 28) of the computers 12.

As used herein, the web application 26 is an application that is accessed over a network such as the Internet or an intranet. In another embodiment, the web application may refer to a software application that is hosted in a browser-controlled environment (e.g., a Java applet) or coded in a browser-supported language (such as JavaScript, combined with a browser-rendered markup language like HTML) and reliant on a the browser application 14 to render the application executable. Web applications use information resources or web documents that are written in a standard format such as HTML and/or XHTML, and supported by a variety of web browsers.

Common examples of information resources are web pages 28 and dashboards. Web pages 28 display a user interface comprising any number of page elements 30, which may also be referred to as user interface (UI) elements 30. A dashboard is an application that may host mini-applications known as widgets, which are also UI elements 30. The end-users 28 of the computers 12 interact with the information resources of the web application 26, e.g., by clicking the UI elements 30 using pointing devices, such as a mouse or stylus. If a user's computer 12 is touch-screen enabled, the user 28 may also interact with web application 26 by touching a display screen of the computer 12 using a stylus or the user's finger.

According to the exemplary embodiment, the server 16 is provided with a hot spot creation component 32 that enables the end-user 28 to customize the UI of an information resource, such as a web page 28 or dashboard, by dynamically creating hot spots without modifying the underlying code by the end-user 28. In one embodiment, each of the end-users 28 may be presented with an option to enable dynamic UI hot spot creation for the web application 26 through display of a hot spot creation button 34 on at least one web page 28.

In operation, the browser application 14 receives information resources, such as web page 28 from the server 16 over the network 18, and displays the web page 28 on a display of the computer 12. When clicked or activated by the end-user, the hot spot creation button 34 causes the hot spot creation component 32 to download and execute on the computer 12. When run, the hot spot creation component 32 places the current webpage in edit mode and enables the end-user 28 to designate a portion of the UI as a launch area for a hot spot. The user is able to designate a size and a location of the hot spot as well as a function to be performed by the hot spot and the action that invokes that function.

After the hot spot is created and the user places a cursor over the location of the hot spot and performs the designated action, the hot spot performs the function designated by the end-user. In one embodiment, the hot spot creation process may be implemented by any conventional scripting language, such as Java, Javascript, Jscript and the like.

In one embodiment the hot spot creation button 34 and the hot spot creation component 32 are programmed by programmer or administrator for user by the end-users 28. While providing the hot spot creation button 34 and the hot spot creation component 32 may require modifications to the web application 26 by the programmer or administrator, the use of the hot spot creation component 32 by the end-users 28 to add hot spots to existing UI's of static web resources does not.

Although the server 16 is shown as a single computer, it should be understood that the functions of server 16 may be distributed over more than one server. Although the hot spot creation component 32 is shown as a single component, the functionality of the hot spot creation component 32 may be implemented using multiple modules/components. In addition, although a server 12 is shown hosting the hot spot creation component 32, the hot spot creation component 32 may be run on any type of computer that has a memory and processor.

Figure 2:
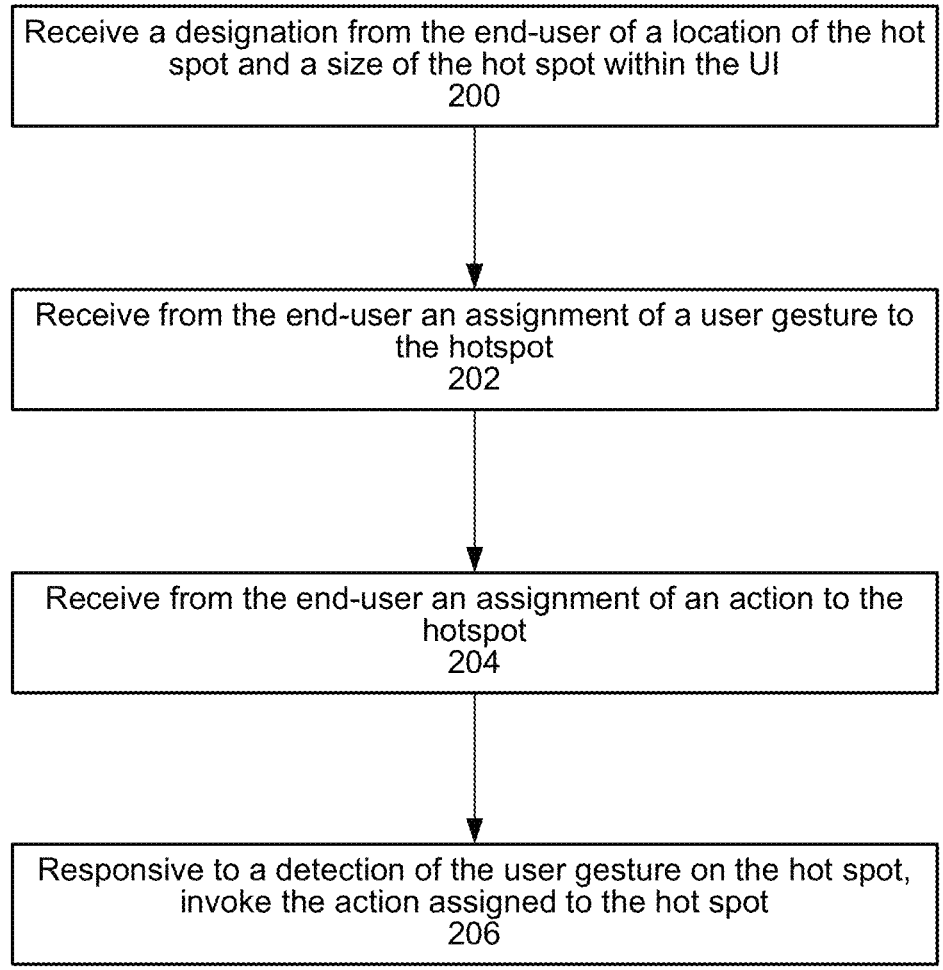
FIG. 2 is a flow diagram illustrating one embodiment of a process for enabling an end-user to dynamically create a hot spot on a user interface (UI) of an information resource without the end-user modifying underlying code of the UI.

FIG. 2 is a flow diagram illustrating one embodiment of a process for enabling an end-user to dynamically create a hot spot on a user interface (UI) of an information resource without the end-user modifying underlying code of the UI.

The process may begin when the end-user activates the hot spot creation component to create a hot spot and the hot spot creation component responds by receiving a designation from the end-user of a location of the hot spot and a size of the hot spot within the UI (block 200). As described above, in one embodiment, the end-user 28 may activate the hot spot creation component 32 by clicking the hot spot creation button 34 displayed on the UI of the information resource (e.g., a web page or a dashboard) on the end-user computer 12.

In one embodiment, the end-user 28 may designate the location and size for the hot spot with a click and drag operation, i.e., clicking a mouse, holding down the mouse button and dragging the cursor until a desired size of the hot spot is reached. In an alternative embodiment, the hot spot creation component 32 may be configured to display a dialog box prompting the end-user 28 to enter location and sizing information.

Figure 3:
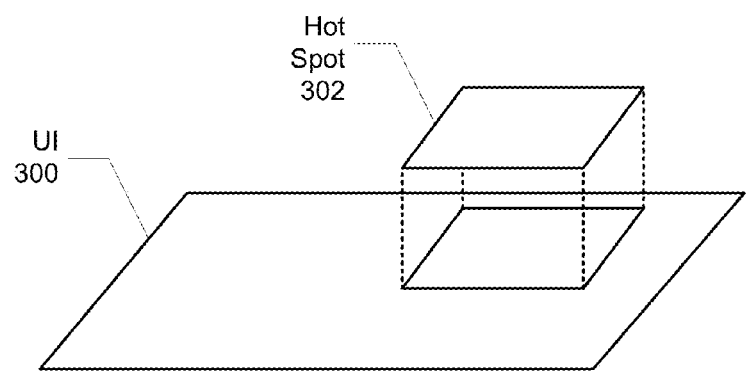
FIG. 3 is a diagram showing an example of a hot spot that has been created over a sub-region of a UI of an information resource by an end-user.

FIG. 3 is a diagram showing an example of a hot spot that has been created over a sub-region of a UI of an information resource by an end-user. In this example, the bottom rectangle represents the original UI 300 of the information resource (e.g., webpage) displayed on the end-user computer 12. The UI 300 may display any type of content such as graphs, charts, tables, maps, text, images and the like. The designation by the end-user 28 defines the hot spot 302 as any polygonal or circular shape within a sub-region of the UI 300. Examples of polygonal or circular shapes include, but are not limited to, a square, a rectangle, a trapezoid, a circle and an ellipse, for instance.

After end-user designation and creation of the hot spot 302, the hot spot 302 may be rendered on the UI 300 during view mode using different types of display attributes, including not limited to, invisibility, an outlined shape, a percentage transparency, a color, and a gradient. Once rendered, the hot spot 302 may appear to "float" above the underlying content of the UI in z-order.

Referring again to FIG. 2, after the end-user defines the hot spot 302, the hot spot creation component 32 receives from the end-user an assignment of a user gesture to the hot spot (202), and receives an assignment of an action to the hot spot (step 204).

During the assignment process, the hot spot creation component 32 receives from the end-user a selection of a user gesture from standard keyboard and mouse events that will invoke the hot spot during operation. The user also assigns one or more actions to be performed once the hot spot is invoked. Each action may also include context information. As an example, the user may assign a right mouse click may display a context menu, while a left click could perform some designation action. The actions may also carry context information.

Figure 4:
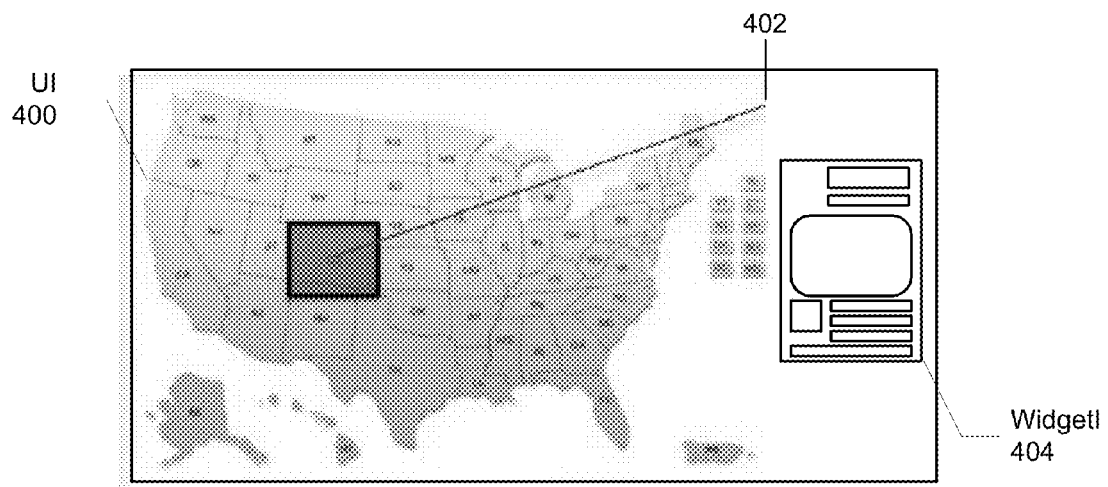
FIG. 4 is a diagram illustrating another example of a hot spot created over a UI.

FIG. 4 is a diagram illustrating another example of a hot spot created over a UI 400. In this example, the UI 400 is map of the United States and the end-user has created a hot spot 402 over the state of Colorado. The hot spot 402 is configured such that when the hot spot 402 is clicked with a pointer, the hot spot 402 performs the action of passing the state name "Colorado" as the context or parameter to a weather widget 404 to display the weather of Colorado.

In one embodiment, the hot spot creation component 32 displays a configuration menu for user selection of the user gesture and the action to be assigned to the hot spot 302.

FIG. 5 is a diagram illustrating an example configuration menu displayed by the hot spot creation component after the user defines a hot spot. The configuration menu 500 may display a list of different types of user gestures 502 for selection, including keyboard sequences and pointer gestures such as "hover," "click," "right click," and "left click." The configuration menu 500 may display a list of different action categories 504 for assigning actions to the hot spot, where each action category 504 may include a list of different types of actions 506 and optional parameters 508 corresponding to the actions 506.

For example, the configuration menu 500 may include a "Browser Actions" action category 504 that contains actions specific to web browsers that may list actions 506 such as "Open Browser Page," where a URL is required as a parameter; and "Show Tool Tip," where a Message is required as a parameter. The configuration menu 500 may include a "Portal Actions" category that contains actions specific to Web portals that may list actions 506 such as: "Launch Portlet," with a parameter or a portlet ID; "Launch Portal Page," with a parameter for a Page ID; and "Pass context to other Portlets on Page," with a parameter for the Context. The configuration menu 500 may include an "Applications Actions" category that contains actions specific to applications that may list actions 506 such as: "Insert New Data into Database," with a parameter for the Context: and "Text Message," with a parameter for the Message.

After the user selects a user gesture 502 and a corresponding action 506 to apply to the hot spot, the hot spot creation component 32 may display a "save" dialog for the user to save the hot spot. After the hot spot if configured and saved, the hot spot creation component 32 returns the information resource to view mode from edit mode and runs the configured hot spot.

Referring again to FIG. 2, during runtime the hot spot creation component 32 responds to a detection of the assigned user gesture over the hot spot by invoking the corresponding action assigned to the hot spot. Referring again to FIG. 4, for example, in response to a detection of the pointer "hovering" over the hot spot over Colorado on the map, the spot creation component 32 would invoke the action of passing the state's name as a parameter to a weather widget, resulting in the weather for Colorado being displayed. Once the user moves the pointer away from the hot spot, the action is terminated.

A method and system for enabling an end-user to dynamically create a hot spot on a user interface (UI) of a static information resource. The disclosed embodiments allow an end-user, as opposed to an administrator, to make static content dynamic without programming without altering the underlying content.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium that includes an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, partly on the user's computer and partly on a remote computer or entirely on the remote computer or server.

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A computer-implemented method for enabling an end-user to dynamically create a hot spot on a user interface (UI) of a web page without the end-user modifying underlying code of the UI, the method comprising:
    serving the web page from a server to a browser application on an end-user computer for display on the end-user computer, wherein the web page includes a hot spot creation button, which when activated by the end-user, causes the hot spot creation component to download and execute on the end-user computer;
    responsive to the end-user activating a hot spot creation component, receiving by the hot spot creation component a designation from the end-user of a location of the hot spot and a size of the hot spot within the UI, wherein receiving the designation from the end-user comprises allowing the end-user to designate the location and size of the hot spot with a click and drag operation whereby a mouse button is held and a cursor is dragged across a display until a desired size of the hotspot is reached;
    receiving from the end-user, by the hot spot software component, an assignment of a user gesture to the hot spot;
    receiving from the end-user, by the hot spot software component, an assignment of an action to the hot spot selected from a configuration menu, wherein the configuration menu lists different action categories including a first category that contains actions specific to web browsers, and a second category that contains actions specific to Web portals, and a third category that contains actions specific to applications; and
    responsive to a detection of the user gesture on the hot spot, invoking the action assigned to the hot spot by the hot spot software component.

2. The method of claim 1, wherein receiving the designation from the end-user of a location of the hot spot and a size of the hot spot further comprises: enabling the end-user to designate the hot spot as any polygonal or circular shape within a sub-region of the UI.

3. The method of claim 1, wherein receiving the designation from the end-user of a location of the hot spot and a size of the hot spot further comprises: creating the hot spot and rendering the hot spot on the UI using a display attribute, including at least one of invisibility, an outlined shape, a percentage transparency, a color, and a gradient.

4. The method of claim 1, wherein receiving from the end-user an assignment of an action to the hot spot, further comprises: receiving a selection of a user gesture from keyboard and mouse events that will invoke the hot spot during operation.

5. An executable software product stored on a non-transitory computer-readable medium containing program instructions for enabling an end-user to dynamically create a hot spot on a user interface (UI) of a web page without the end-user modifying underlying code of the UI, the program instructions for:
    serving the web page from a server to a browser application on an end-user computer for display on the end-user computer, wherein the web page includes a hot spot creation button, which when activated by the end-user, causes the hot spot creation component to download and execute on the end-user computer;
    responsive to the end-user activating a hot spot creation component, receiving by the hot spot creation component a designation from the end-user of a location of the hot spot and a size of the hot spot within the UI, wherein receiving the designation from the end-user comprises allowing the end-user to designate the location and size of the hot spot with a click and drag operation whereby a mouse button is held and a cursor is dragged across a display until a desired size of the hotspot is reached;
    receiving from the end-user, by the hot spot software component, an assignment of a user gesture to the hot spot;
    receiving from the end-user, by the hot spot software component, an assignment of an action to the hot spot selected from a configuration menu, wherein the configuration menu lists different action categories including a first category that contains actions specific to web browsers, and a second category that contains actions specific to Web portals, and a third category that contains actions specific to applications; and
    responsive to a detection of the user gesture on the hot spot, invoking the action assigned to the hot spot by the hot spot software component.

6. The executable software product of claim 5, wherein the instructions for receiving the designation from the end-user of a location of the hot spot and a size of the hot spot further comprises instructions for: enabling the end-user to designate the hot spot as any polygonal or circular shape within a sub-region of the UI.

7. The executable software product of claim 5, wherein the instructions for receiving the designation from the end-user of a location of the hot spot and a size of the hot spot further comprises instructions for: creating the hot spot and rendering the hot spot on the UI using a display attribute, including at least one of invisibility, an outlined shape, a percentage transparency, a color, and a gradient.

8. The executable software product of claim 5, wherein the instructions for receiving from the end-user an assignment of an action to the hot spot, further comprises instructions for: receiving a selection of a user gesture from keyboard and mouse events that will invoke the hot spot during operation.

9. A system, comprising:
    a server; and
    an end-user computer comprising;
        a memory; and
        a processor coupled to the memory;
        wherein the end-user computer is coupled to the server via a network, such that the server serves a web page to a browser application on an end-user computer for display on the end-user computer, wherein the web page includes a hot spot creation button, which when activated by the end-user, causes a hot spot creation component to download and execute on the processor of the end-user computer;

the hot spot creation component configured to:

receive a designation from the end-user of a location of the hot spot and a size of the hot spot within the UI, wherein receiving the designation from the end-user comprises allowing the end-user to designate the location and size of the hot spot with a click and drag operation whereby a mouse button is held and a cursor is dragged across a display until a desired size of the hotspot is reached;

receive from the end-user an assignment of a user gesture to the hot spot;

receive from the end-user an assignment of an action to the hot spots elected from a configuration menu, wherein the configuration menu lists different action categories including a first category that contains actions specific to web browsers, and a second category that contains actions specific to Web portals, and a third category that contains actions specific to applications; and responsive to a detection of the user gesture on the hot spot, invoke the action assigned to the hot spot.

10. The computer of claim 9, wherein the end-user is enabled to designate the hot spot as any polygonal or circular shape within a sub-region of the UI.

11. The computer of claim 9, wherein the hot spot is created and rendered on the UI using a display attribute, including at least one of invisibility, an outlined shape, a percentage transparency, a color, and a gradient.

12. The computer of claim 9, wherein a selection of a user gesture from keyboard and mouse events is received that will invoke the hot spot during operation.

\* \* \* \* \*